(12) United States Patent
Guzman

(10) Patent No.: US 6,997,122 B1
(45) Date of Patent: Feb. 14, 2006

(54) METHOD AND APPARATUS FOR DISTRIBUTING SOIL AMENDMENTS

(76) Inventor: Richard Guzman, 479 Bill Watkins Rd., Hoschton, GA (US) 30548

( * ) Notice: Subject to any disclaimer, the term of this patent is extended or adjusted under 35 U.S.C. 154(b) by 0 days.

(21) Appl. No.: 10/644,017

(22) Filed: Aug. 20, 2003

Related U.S. Application Data

(60) Continuation of application No. 10/341,251, filed on Jan. 14, 2003, now abandoned, which is a division of application No. 09/759,270, filed on Jan. 16, 2001, now Pat. No. 6,513,447.

(51) Int. Cl.
*A01C 7/08* (2006.01)
*A01C 17/00* (2006.01)

(52) U.S. Cl. .................. 111/133; 111/11; 111/900; 172/21; 172/189; 172/200; 172/612

(58) Field of Classification Search ........ 111/130–133, 111/11–13, 200, 900–902; 172/21, 22, 612, 172/189, 197, 199, 200
See application file for complete search history.

(56) References Cited

U.S. PATENT DOCUMENTS

| | | | |
|---|---|---|---|
| 2,768,570 A * | 10/1956 | Strid | 172/19 |
| 3,578,186 A | 5/1971 | Thomas | 214/83.22 |
| 3,647,095 A | 3/1972 | Holland | 214/83.36 |
| 3,685,468 A * | 8/1972 | Paige et al. | 111/11 |
| 3,685,469 A * | 8/1972 | Rogers | 111/158 |
| 4,078,677 A | 3/1978 | Huggins, Jr. et al. | 214/82 |
| 4,685,856 A | 8/1987 | Hesse, Jr. | 414/515 |
| 4,717,307 A | 1/1988 | Ciuffetelli | 414/300 |
| 5,100,277 A | 3/1992 | Musil | 414/334 |
| 5,765,945 A * | 6/1998 | Palmer | 366/167.1 |
| 5,906,436 A * | 5/1999 | Cole et al. | 366/346 |
| 5,934,862 A | 8/1999 | Brown et al. | 414/528 |
| 6,024,033 A | 2/2000 | Kinkead et al. | 111/11 |
| 6,090,195 A * | 7/2000 | Andersen et al. | 106/162.51 |

FOREIGN PATENT DOCUMENTS

JP 6205666 * 7/1994

* cited by examiner

*Primary Examiner*—Christopher J. Novosad
(74) *Attorney, Agent, or Firm*—Bacon & Thomas

(57) ABSTRACT

Method and apparatus for dispensing aggregates for lawn improvement. Aggregates are delivered to the site in a primary dispensing vehicle, which is configured to allow a smaller secondary dispensing vehicle to be loaded with the aggregate directly from the primary vehicle. The process includes aerating the soil, distributing a variety of soil amendments evenly over the area to be treated and then dragging a unique drag mat over the area to make a smooth contour and to even the distribution of the aggregate.

8 Claims, 3 Drawing Sheets

METHOD AND APPARATUS FOR DISTRIBUTING SOIL AMENDMENTS

This application Ser. No. 10/644,017 is a continuation of application Ser. No. 10/341,251, filed on Jan. 14, 2003, now abandoned, which is a divisional of application Ser. No. 09/759,270, filed on Jan. 16, 2001, now U.S. Pat. No. 6,513,447.

BACKGROUND OF THE INVENTION

The present invention relates, in general, to a method and apparatus for maintaining and improving the growth density of turf grass root systems in residential lawns, commercial lawns, athletic fields, recreational areas including golf courses and agricultural fields used for cattle grazing or hay production.

The invention described and claimed provides a more efficient and cost effective way of applying a variety of naturally occurring mineral based aggregates and soil amendments in a system which greatly improves the growing conditions for ornamental grass areas. In addition, the apparatus disclosed for these applications is of a unique design, which greatly improves growing conditions of grass turf and other planting materials by increasing the depth and density of the plant's root system. In addition, the efficiency of the process can be seen particularly in the application of granular aggregates as well as compost, fertilizer and other soil amendments.

To improve the appearance of an ornamental lawn it is desirable to eliminate the harmful effects of the thatch of dead grass and clippings which accumulate during the life of the lawn. In the past, this was accomplished by "dethatching" using power rakes or hand rakes to loosen the thatch and then raking the thatch from the lawn and disposing of it in a land fill or other dumping areas. This operation is time consuming as well as labor intensive. Since lawn improvements are most effective if carried out during the peak growing season, the labor described above is, of necessity done in hot and often humid weather conditions.

Another step in the traditional methods of lawn improvements is to deliver any materials to be applied to the lawn by truck and dump them in a pile on the site. Next, the material must be shoveled into wheelbarrows or distribution apparatus to be applied to the lawn. Again, the process is labor intensive and must be done under adverse weather conditions. If the shoveling task is to be avoided in the present systems, a front-end loader or similar machine must be trucked to the site for loading the distribution machine and picked up after the job is finished; another time consuming and costly event for the contractor.

The present invention also discloses a system including the order of application of various aggregates and amendments, which give the optimum growing conditions for ornamental grasses. If certain soil amendments are applied in the wrong sequence in the process or are not covered quickly by the next application, their effectiveness is diminished or totally lost.

SUMMARY OF THE INVENTION

The present invention overcomes these disadvantages by improving the efficiency of distribution of the materials to be applied to the lawn as well as using a specific order of application and selection of materials, which may be varied according to site conditions.

With the present invention any materials which are to be spread on the area are delivered to the site in a unique vehicle which allows the materials to be loaded directly into the final distribution machine thereby eliminating the labor intensive shoveling as well as speeding up the time for completing the job.

After application of the materials, they are smoothed using a unique drag screen which spreads the material evenly over the treated area and leaves a smooth eye-appealing surface.

Finally, this system disclosed herein provides a systematic method for applying the materials in the order that will give the most benefit to the growing area treated.

DESCRIPTION OF THE PREFERRED EMBODIMENT

Figure 1:
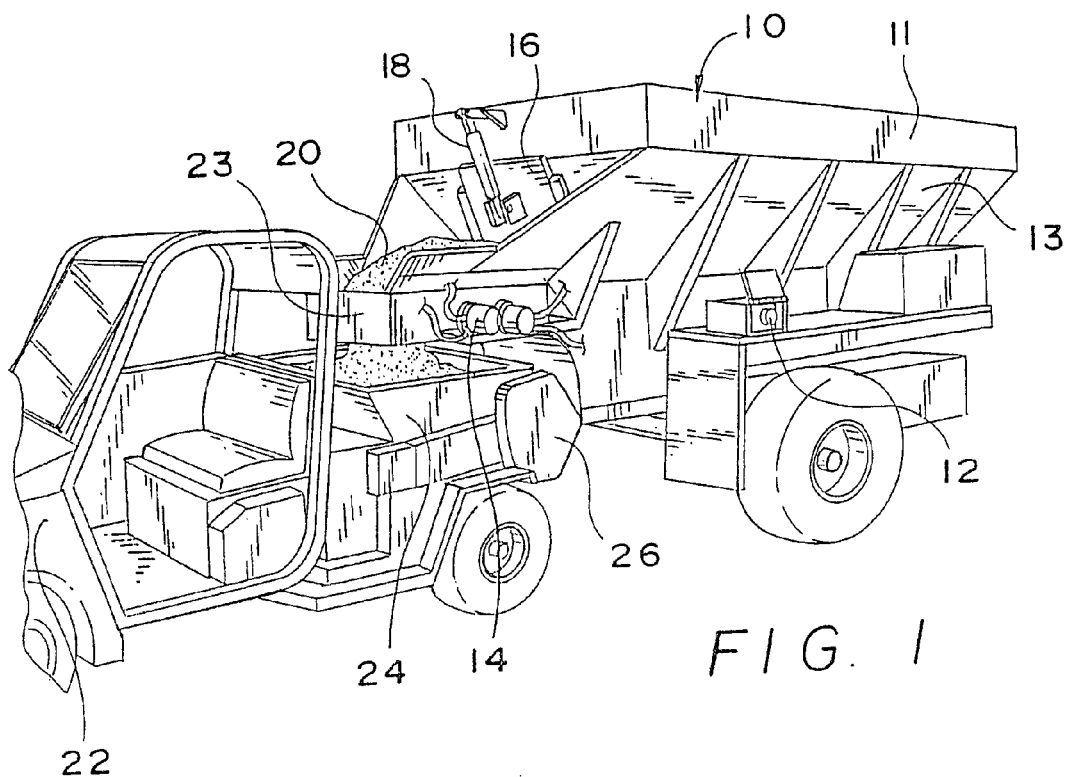
FIG. 1 is a side view of the primary material distribution vehicle and the secondary distribution vehicle in the loading position.

Referring now to FIG. 1, there is shown generally at 10, the primary delivery vehicle for the system. The vehicle comprises a basic truck frame for a truck having a total vehicle gross weight of 16,000 t0 33,000 pounds. The vehicle is equipped with a hopper type body 11 having sloping sides 13 to allow the load to be fueled toward the bottom of the hopper as the load is dispensed. Extending from the rear of the truck is the dispensing mechanism 23. Note that the dispensing mechanism 23 is located approximately four feet above the ground so that a topdressing vehicle 22 can be backed under the dispenser 23 for loading. This will be described in more detail below.

The dispensing mechanism 23 consists of a chain link conveyer of any known type. The chain link conveyer runs the entire length of the lower surface of the hopper 11. The chain link conveyer is activated by a pair of hydraulic motors 14 supplied with high-pressure hydraulic fluid from a pump driven by a power-takeoff from the truck engine. The pump speed is controlled by an electronic control panel 12 on the side of the apparatus 10. Aggregate 20 is released from the hopper type body 11 by opening a gate 16 which is opened by a hydraulic piston 18 controlled by the electronic control panel 12. The rate of delivery of aggregate can be controlled by regulating the speed of the motors 14, by adjusting the opening of the gate 16 and by the speed of the vehicle truck engine which powers the power take-off feeding the hydraulic pump.

The cab 22 is shown backed up to the dispensing mechanism 23 of the primary delivery vehicle loaded with aggregate 20. The cab 22 has at its rear end a hopper 24 (FIG. 2) for receiving the aggregate 20. Note that the hopper 24 of the cab 22 moves under the raised dispensing mechanism 23 of the hopper type body 11. The cab 22 is of any commercially available machine and includes hopper 24 and a dispenser 26. The cab 22, hopper 24 and dispenser 26 together form a topdresser. The cab 22 is a power-driven vehicle similar in size to a standard golf cart on which the hopper 24 and dispensing 26 are mounted.

Figure 2:
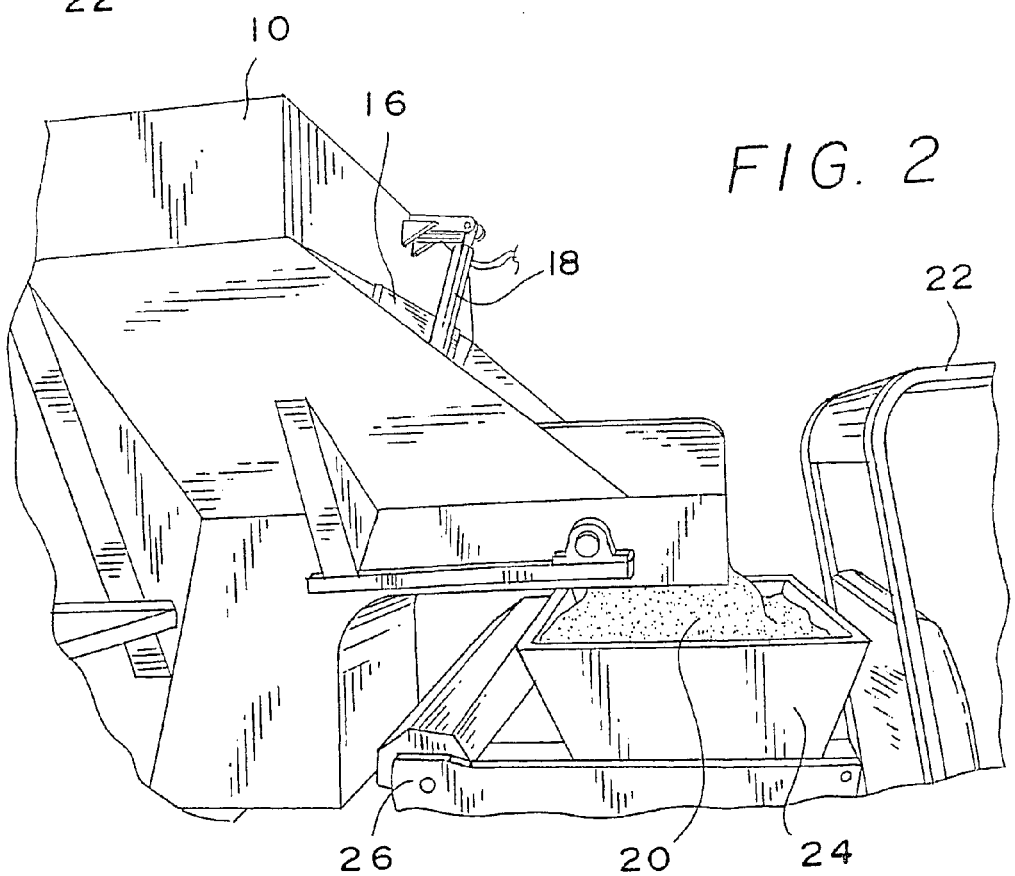
FIG. 2 is a view of the discharge end of the vehicle of FIG. 1.

Referring now to FIG. 2, there is shown a more close-up view of the dispensing 26 of the primary delivery vehicle. Again, the hopper type body 11 is opened by use of the gate 16 operated by the hydraulic cylinder 18. As can be seen, the aggregate 20 falls from the conveyer of the dispensing mechanism 23 directly into the hopper 24 of the topdresser. The advantages of this combination of apparatus allows the topdresser to be loaded directly from the primary delivery vehicle rather than having the primary load dumped in a pile on the site and then shoveled into the topdresser by hand, thus eliminating a substantial amount of labor and its associated costs. Using the equipment and method of this invention, a single operator can load ¾ to one ton of aggregate into the hopper of the topdresser in about 20 seconds after engaging the conveyer switch at the control panel 12.

Figure 4:
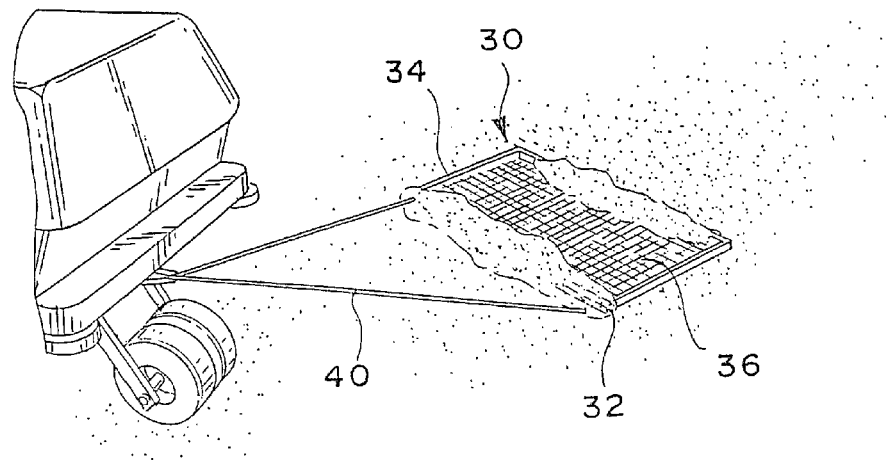
FIG. 4 is a view of the drag mat of FIG. 3 in operation.
Figure 3:
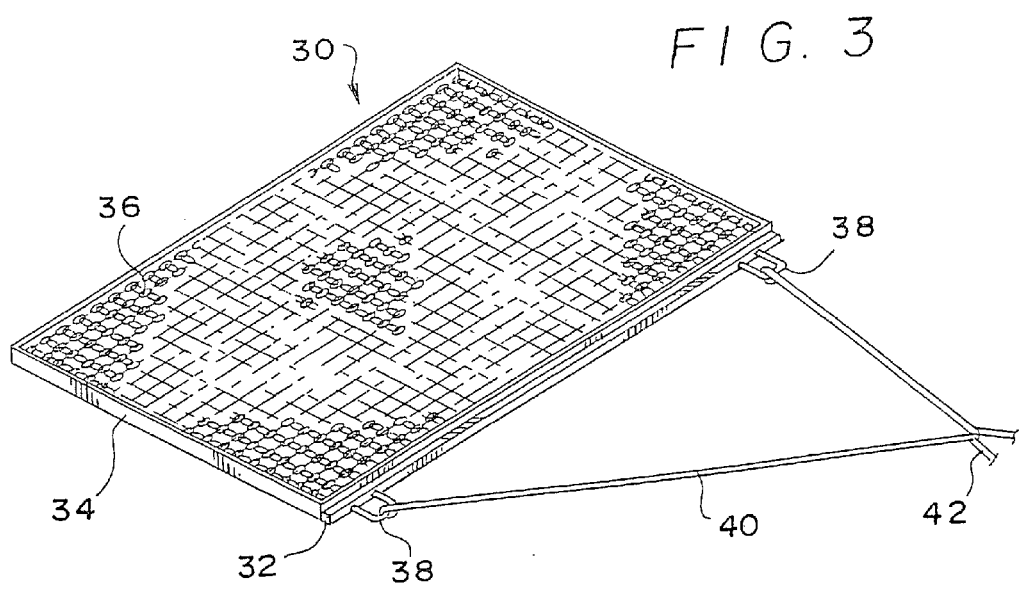
FIG. 3 is an isometric view of the drag mat of the invention.

Referring now to FIG. 3, there is shown a detail drawing of the drag mat used in the practice of this invention. The leading edge of the mat 30 is made of a hardened steel bar approximately ⅜" square. A frame 34 is a rectangle 3'6" long and 2'4" wide made of angle iron of about 1"×1". In the area enclosed by the frame a flexible chain link material is fastened. At the front edge of the mat there is attached two loops 38 to which is attached to a cable or chain 40. The cable or chain is joined at its distal end by a ring or other suitable means 42 for hooking the mat to a vehicle when it is to be used in the method. FIG. 4 shows the mat in operation. The detailed function of the mat will be described more fully in the description of the operation of the system.

Figure 5A:
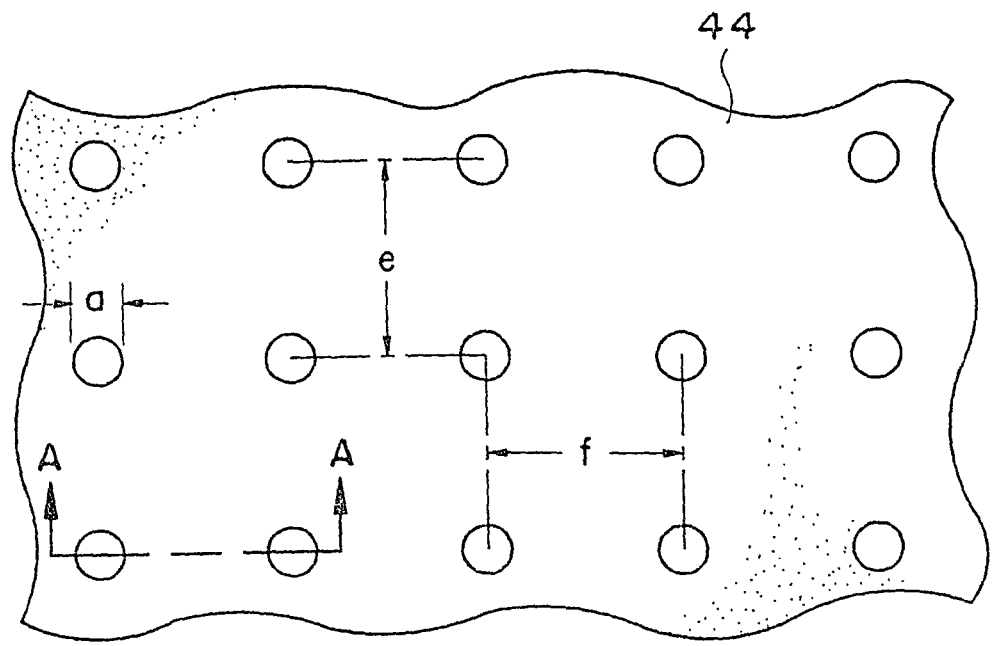
FIGS. 5A and 5B illustrate the size and spacing of aeration holes.
Figure 5B:
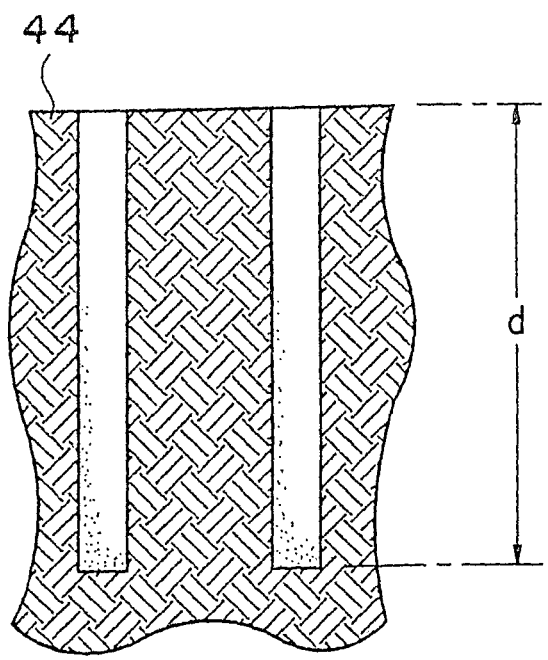

FIGS. 5A and 5B show specified area of soil 44 to be treated, and the general plan for spacing, size and depth of aeration holes made in the first step of the method. "a" dimension indicates the core diameter, while the "e" and "f" dimensions indicate the center to center spacing of the cores, and the "d" dimension indicates the depth of the cores. The choice of these dimensions depends on the conditions set forth in Table 1 below.

In this first aerating step, a mechanized aerator unit is first sprayed with a cleansing solution to eliminate contamination from pathogens from previous applications. This cleansing step prevents the spread of turf grass diseases from one application site to another. The mechanized aerator unit is one that is adjusted for size, density and depth of core according to the information on Table 1 below.

TABLE 1

Aeration core spacing

| Soil Type | dia. inches (a) | length inches (d) | spacing inches on center (f) | density cores per M sq. ft. |
|---|---|---|---|---|
| Heavy clay - clean | ¾" | 3.0" | 3' | 6,000 |
| Heavy clay - sandy | ⅝ | 2.5 | 2.25 | 23,000 |
| Sandy Loam | ½ | 2.5 | 2.25 | 23,000 |
| Sand | ⅜ | 3.0 | 2.25 | 23,000 |
| Loam | ⅝ | 3.0 | 2.25 | 16,000 |
| Topsoil - clean | ¾ | 2.5 | 2.25 | 23,000 |
| All soils - containing rock | ¾ | 4.5 | 6.25 | 7,000 |
| All soils - lightly Compacted | ¾ | 4.5 | 6.25 | 7,000 |

The second step which is an optional step is to apply an even coating of a mycorrhizal fungus such as basidomycete (*Coprinus macorhizus*). Much of the fungus, which is spread in a powdered or pellet form, will fall into the aeration holes. This type of fungus forms a closely woven mass around the roots of the existing grass and may even penetrate the root structure enhancing the root system depth of growth and density of growth. An additional option in this second step is the application of fertilizer in pellet form. The selection of fertilizer blend of nitrogen, phosphate and potash is dependent on turf type, soil conditions and environmental conditions.

The next step is to spread an aggregate material, commonly called topdressing, over the area. The aggregate must be spread quickly after the application of the fungus (within 30 minutes) since the fungus will be damaged by exposure to the air for an extended period of time. This aggregate is preferably, a mixture of river washed sand of sieve size 33 with no more than 5% of fines sand, composted organic materials as well as other naturally occurring soil amendments, the selection of which are dictated by the soil conditions and environment. This application of aggregate material will, at least partially, fill the aeration holes thus protecting the fungus from deterioration as well as lightening the general character of the soil. This is particularly true when the basic composition of the soil is clay or other soil, which resists the absorption of water and other nutrients. The sand will absorb water and nutrients and feed the grass roots needed amendments applied in the next step of the process.

After the sand has been spread, the entire area is dragged using the drag mat shown in FIG. 3. The construction of the mat results in two benefits from the dragging step. First, the drag mat evens out the coating of sand to provide a uniform coating and breaks up the aeration plugs and distributes the soil therefrom with the sand. Secondly, the mat, because of its construction, levels the area treated. This is accomplished by providing the mat with a hardened steel leading edge about ⅜" square in cross section and extending along the length of the front edge the mat. This hardened steel bar scrapes off the high points in the surface of the area and deposits the scraped-up soil into the low spots of the area. Soil scraped from high spots tends to flow over the leading edge of the mat and be dispersed through the openings in the chain link mat with the sand and aeration plugs.

It is to be understood that all of the aggregates applied, sand, compost, fertilizer as well as the fungus powder may be applied using the equipment described above. In the alternative, some of these may be applied using conventional manual spreaders if the makes this equipment more efficient.

Since many lawn areas have an uneven surface and also include planted areas which cannot be accessed easily by mechanized spreaders. In these areas all of the aggregates may be applied and smoothed manually. Also, even in the areas treated mechanically, it is often necessary to fill small voids using hand scoops and rake these areas by hand.

The final step in this process is to apply a liberal amount of water over the treated area. This step feeds the grass roots that needed moisture and helps in settling the various aggregate applied into a uniform aggregate coating.

The following table lays out the steps described above in a graphical manner to aid in understanding the method of the invention.

TABLE 2

| 1 | Aeration | mechanically breaks up thatch and provides access to roots by aggregates |
|---|---|---|
| 2 | Spread fungus | Encourages root growth |
| 3 | Spread sand | Protect fungus & receive aggregates |
| 4 | *Spread compost | Add organic matter to soil |
| 5 | *Spread fertilizer | Enhance growth |
| 6 | Drag | Spread aggregate and smooth |
| 7 | Scoop | Fill open spots |
| 8 | Rake | Distribute and smooth scoops |

*denotes optional step

Thus it can be seen that there is herein described unique apparatus for delivering and dispensing soil aggregates and a unique method of combining combinations of these aggregates in a specified order that will have a maximum effect in lawn improvement.

What is claimed is:

1. A method of improving turf conditions to improve plant growth over a specified area of soil, using a mechanized aerator unit, comprising the steps of:

cleaning the mechanized aerator unit;

aerating the soil of the specified area by punching uniform holes of a given diameter, depth and relative spacing in a uniform pattern in the specified area using the mechanized aerator unit, said diameter, depth and relative spacing being a function of the soil condition;

applying a selected granular aggregate over the specified area to at least partially fill the aerating uniform holes using a vehicle which dispenses the selected granular aggregate uniformly;

applying soil amendments over the selected area using a vehicle which dispenses the soil amendments uniformly; and smoothing the selected area using a drag mat to even the distribution of the applied selected granular aggregate and cause the surface of the selected area to have a smooth appearance.

2. The method according to claim 1 and including the additional step of moistening the area with water before aerating the soil.

3. The method according to claim 1 wherein the granular aggregate is sand.

4. The method according to claim 2 wherein the soil amendments include compost.

5. The method according to claim 2 wherein the soil amendments include fertilizer.

6. The method according to claim 2 wherein the soil amendments include compost and fertilizer.

7. The method according to claim 1 wherein a mycorrhizal fungus is applied before the application of the granular aggregate.

8. The method according to claim 1 wherein the soil condition comprises one of: heavy clay—clean; heavy clay—sandy; sandy loam; sand; loam; topsoil—clean; all soils—containing rock; and all soils—lightly compacted.

* * * * *